(12) United States Patent
Yoshida (10) Patent No.: US 7,397,960 B2
(45) Date of Patent: Jul. 8, 2008

(54) METHOD OF AND COMPUTER SYSTEM FOR EXECUTING AREA-DIVISION AND COMPRESSION OF DOCUMENT IMAGE

(75) Inventor: Hiroki Yoshida, Takatsuki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 691 days.

(21) Appl. No.: 10/809,843

(22) Filed: Mar. 26, 2004

(65) Prior Publication Data

US 2004/0208368 A1 Oct. 21, 2004

(30) Foreign Application Priority Data

Mar. 31, 2003 (JP) ............................. 2003-094230

(51) Int. Cl.
*G06K 9/36* (2006.01)

(52) U.S. Cl. .................................... 382/239

(58) Field of Classification Search ................ 382/167, 382/240, 232–233, 243–248; 358/426.02, 358/426.04, 426.06
See application file for complete search history.

(56) References Cited

U.S. PATENT DOCUMENTS

| 5,392,362 | A |   | 2/1995 | Kimura et al. |         |
|-----------|---|---|--------|---------------|---------|
| 5,668,897 | A | * | 9/1997 | Stolfo        | 382/283 |
| 5,748,780 | A | * | 5/1998 | Stolfo        | 382/232 |
| 5,892,847 | A | * | 4/1999 | Johnson       | 382/232 |
| 5,991,515 | A | * | 11/1999 | Fall et al.  | 358/1.15 |
| 6,999,619 | B2 | * | 2/2006 | Toda         | 382/172 |

FOREIGN PATENT DOCUMENTS

| JP | 06-152985 A | 5/1994 |
| JP | 08-181867 A | 7/1996 |
| JP | 9-6974 A | 1/1997 |
| JP | 10-108011 | 4/1998 |
| JP | 11-205615 A | 7/1999 |
| JP | 2001-76095 A | 3/2001 |
| JP | 2001-136521 | 5/2001 |
| JP | 2002-245466 A | 8/2002 |

OTHER PUBLICATIONS

Japanese Office Action dated Aug. 9, 2005 and English Translation.

* cited by examiner

*Primary Examiner*—Jose L. Couso
(74) *Attorney, Agent, or Firm*—Buchanan Ingersoll & Rooney PC (57) ABSTRACT

A personal computer is operable to sectionalize a document image to form a plurality of image areas each having an attribute associated with a compression mode. Then, it is determined whether the image areas overlap with one another to form an overlap area. When the overlap area is formed, the overlap area is separated from the engaged image areas. If one of the engaged image areas is included within the remaining image areas, an attribute for the overlap area is set up according to the inclusive relationship of the engaged image areas. If there is not such an inclusive relationship, the attribute in the overlap area is set up according to the occupancy rate of the overlap area to each of the engaged image areas, and weighting coefficients of the respective attributes of the engaged image areas.

8 Claims, 11 Drawing Sheets

○ CASE WHERE THREE OR MORE OF AREAS OVERLAP WITH ONE ANOTHER

CALCULATE Eval_(i) FOR EACH OF AREA 1,2 AND 3
CHANGE TO AREA ATTRIBUTE OF MAXIMUM Eval_(i)

Fig.7

○ CASE WHERE ONE AREA IS INCLUDED WITHIN OVERLAP AREA OF PLURAL AREAS

DIVIDE AREAS 1 AND 2

CHANGE ATTRIBUTE IN AREAS 4 AND 3 ACCORDING TO INCLUSIVE RELATIONSHIP

Fig.8

Th_Photo=(35*20)/(100*100)=0.07
Th_Letter=(35*20)/(20*80)=0.4375

The_Photo=(1-0.07)*1.5=1.4895
The_Letter=(1-0.4375)*3=1.6875

Fig. 9

CASE1

Fig.10

Th_Photo=(85*35)/(100*100)=0.2975
Th_Letter=(85*35)/(35*120)=0.7083

The_Photo=(1-0.2975)*1.5=1.50375
The_Letter=(1-0.7083)*3=0.8715

Fig. 11 CASE2

METHOD OF AND COMPUTER SYSTEM FOR EXECUTING AREA-DIVISION AND COMPRESSION OF DOCUMENT IMAGE

This application is based on No. 2003-94230 filed in Japan, the contents of which are hereby incorporated by reference.

BACKGROUND OF THE INVENTION

1. Field of the Invention

The present invention relates to a method of and a computer system for executing area-division and compression of a document image.

2. Description of Prior Art

Generally, in an image processing system for digital printing, a document image is read using a scanner or the like to temporarily store image data corresponding to the document image onto a memory, and then an image is printed based on the image data stored on the memory. In order to efficiently utilize a memory limited in storage capacity, or reduce the storage capacity of a memory to be installed in the image processing system, or increase the transmission rate of the image data, the image processing system is configured such that the image data is stored in a compressed form, and the stored image data is expanded in the image-printing process.

As for the document image, there are various types, such as photograph and graphic, different in attribute (image characteristic), and a compression technique optimal to each image data of such document images is varied depending on their attributes. Therefore, in this type of conventional image processing system, a plurality of compression techniques are typically employed, and selectively used in conformity to each of the attributes of the document images.

Further, a document image on a single sheet can include a plurality of images different in attribute in a mixed manner. In such a case, if the plural types of image data of the document image are simply compressed using a single compression technique, the entire document image cannot be optimally compressed. From this point of view, there has been proposed an image compression technique in which a document image is divided into a plurality of areas based on their respective attributes, and each of the areas is individually compressed in conformity to the attribute thereof (see, for example, Japanese Laid-Open Patent Publications No. 2001-136521 and No. 10-108011).

According to the above conventional compression technique, only if a plurality of areas different in attribute are separated or independent from each other in a document image on a single sheet, respective image data of the areas can be optimally compressed. However, as the result of a process of dividing a document image into a plurality of areas based on their respective attributes, one area associated with a first attribute is likely to partly or fully overlap with another area associated with a second attribute different from the first attribute. In other words, a certain area has a plurality of attributes, and all of the plural attributes are overlappingly recognized for this area in the area division process. In such a case, the above conventional image-data compression technique cannot identify the attribute of the overlap area, and consequently cannot determine any specific compression technique to be used for the overlap area.

SUMMARY OF THE INVENTION

In view of the above conventional problem, it is therefore an object of the present invention to provide an image-data compression technique for use in a process of dividing a document image with a plurality of mixed images different in attribute, into a plurality of areas, capable of performing optimal compression even in an overlap area where the areas partly or fully overlap with each other.

According to an aspect of the present invention, there is provided a method of executing area-division/compression of a document image, which may be automatically executed by a computer using a program for executing the method. The method includes first to fourth steps as described below.

In the first step, a document image is sectionalized (or divided) on the basis of attributes associated with a compression mode to form a plurality of image areas each having an attribute. In the second step, it is determined whether the image areas partly or fully overlap with one another to form an overlap area. In the third step, if the overlap area is formed, the overlap area is separated from the image areas overlapping with one another (hereinafter referred to as "engaged areas"), and then an attribute associated with the compression mode for the overlap area is newly set according to priorities of the respective attributes of the engaged areas, and the positional relationship between the overlap area and each of the engaged areas. In the fourth step, each of the image areas and the overlap area is compressed using a compression technique corresponding to each of their attributes.

In the third step, if one of the engaged areas is included within the remaining image areas, the attribute for the overlap area may be set up according to an inclusive relationship of the engaged areas. Alternatively, the attribute for the overlap area may be set up according to the occupancy rate of the overlap area to each of the engaged areas, and weighting coefficients of the respective attributes of the engaged areas. Further, in the fourth step, the overlap area may be compressed by a combination of the compression technique for the respective attributes of the engaged areas and the compression technique for the attribute of the overlap area.

According to another aspect of the present invention, there is provided a computer system for executing area-division/compression of a document image. The computer system includes first to fourth sections which perform the first to fourth steps of the above-mentioned method, respectively.

According to the method or computer system of the present invention, an optimal area division can be executed while minimizing erroneous determinations. In addition, any overlap area can be eliminated to avoid any unproductive processing in compression/storage processing while allowing an optimal compression method to be applied thereto in consideration of the respective attributes (characteristic) of the divided areas. Furthermore, the need for acquiring information about surroundings of the overlap area can be eliminated to achieve a high-speed image data professing.

According to the present invention, in a process of dividing a document image including a plurality of mixed images different in attribute, into a plurality of areas, and compressing image data of the areas, an optimal compression can be performed even in an overlap area where the areas partly or fully overlap with one another.

BRIEF DESCRIPTION OF THE DRAWINGS

Other features and advantages of the present invention will be apparent from the accompanying drawings and from the detailed description.

DETAILED DESCRIPTION OF THE PREFERRED EMBODIMENTS

With reference to the drawings, an embodiment of the present invention will now be specifically described.

Figure 1:
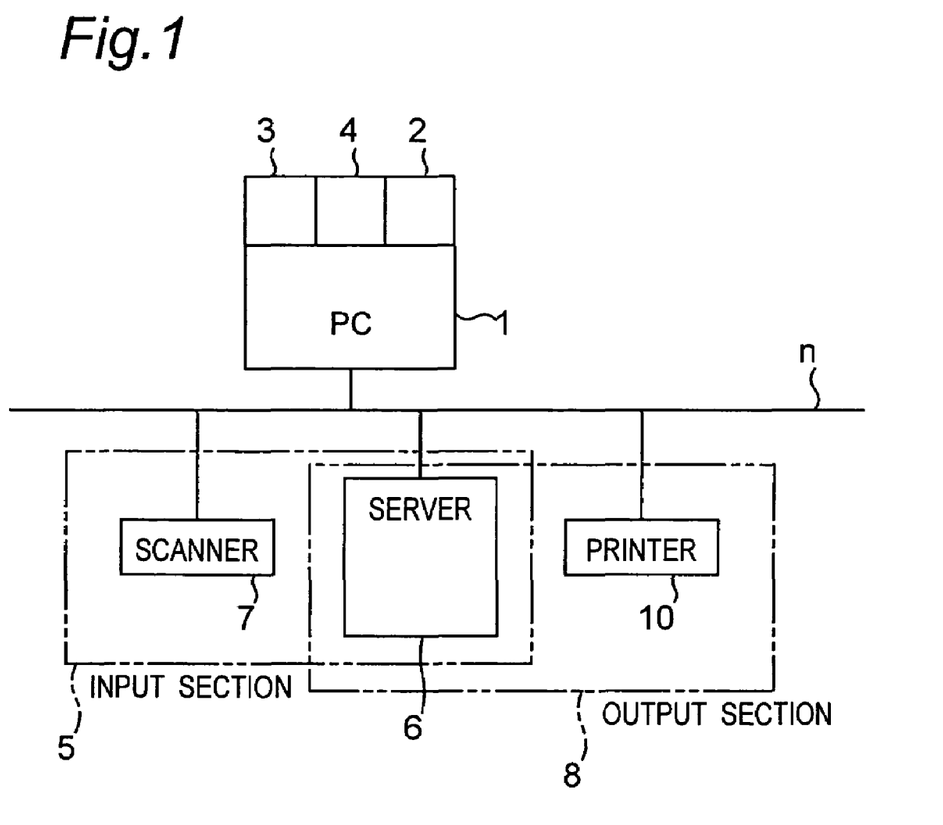
FIG. 1 is a block diagram showing one example of an image processing systems for executing an area-division/compression processing according to one embodiment of the present invention.

FIG. 1 is a block diagram showing one example of an image processing system for executing a document-image area-division/compression processing according to the present invention. As shown in FIG. 1, this image processing system includes an input section 5 for entering image data therethrough, a personal computer 1 capable of executing various programs, and an output section 8 for outputting processed image data. In the image processing system, all of the personal computer 1, a scanner 7 capable of reading a document image at a desired resolution, a server capable of storing various data, such as image data and program data, to serve as an external storage device, and a printer 10 for printing out on a recording sheet are connected with each other via a local area network n (LAN).

The personal computer 1 is equipped with a monitor 3 for displaying data, and an input device 4 including a keyboard, a mouse and others. The personal computer 1 also incorporates therein a hard disk 2 as a built-in storage device, and a Data Base is established in the personal computer 1 including the hard disk 2. This Data Base includes various databases, such as an area-information database, an area-attribute changing table, and a compression database. Further, the personal computer 1 includes a processing module for performing an area-division/compression processing according to the present invention, and another processing module for performing other conventional image processing.

While this embodiment will be described in connection with a system in which all of an input device, an image processing device and an output device are connected with each other via a local area network n, the present invention may be executed using an apparatus constructed by integrally combining a scanner (input section), an image processing section and a printer (output section), such as an MFP (Multiple Function Peripheral).

In the image processing system, image data corresponding to a document image is entered from the input section 5 into the personal computer 1. The input section 5 includes the server 6 for supplying image data, and the scanner 7 for reading a document image and converting the read document image into image data. The personal computer 1 is operable to output image data stored in the Data Base (hard disk 2) to the output section 8. The output section 8 includes the printer 10 for printing an image according to the output image data.

A document-image area-division/compression technique using the personal computer 1 will be described below. First of all, an outline or fundamental concept of the document-image area-division/compression will be described. The personal computer 1 executes the following procedure according to an area-division/compression program to perform the document image area-division/compression. Specifically, the personal computer 1 first sectionalizes (or divides) a document image into a plurality of image areas each having an attribute associated with a compression mode. Then, the personal computer 1 determines whether the image areas partly or fully overlap with each other to form an overlap area.

When the formation of an overlap area is determined, the overlap area is separated (or divided) from the engaged areas or the image areas overlapping with each other. Then, an attribute associated with one compression mode is newly set up in the overlap area according to priorities of the respective attributes of the engaged areas, and the positional relationship between the overlap area and each of the engaged areas. For example, if one image area in the engaged areas is included within the remaining image area(s), an attribute will be set up in the overlap area according to the inclusive relationship of the engaged areas. Otherwise, if there is not such an inclusive relationship, an attribute will be set up in the overlap area according to the occupancy rate of the overlap area to each of the engaged areas, and weighting coefficients of the respective attributes of the engaged areas. After the setting of the attribute of the overlap area, each of the image areas and the overlap area is compressed using a compression technique corresponding to each of their attributes.

Figure 2:
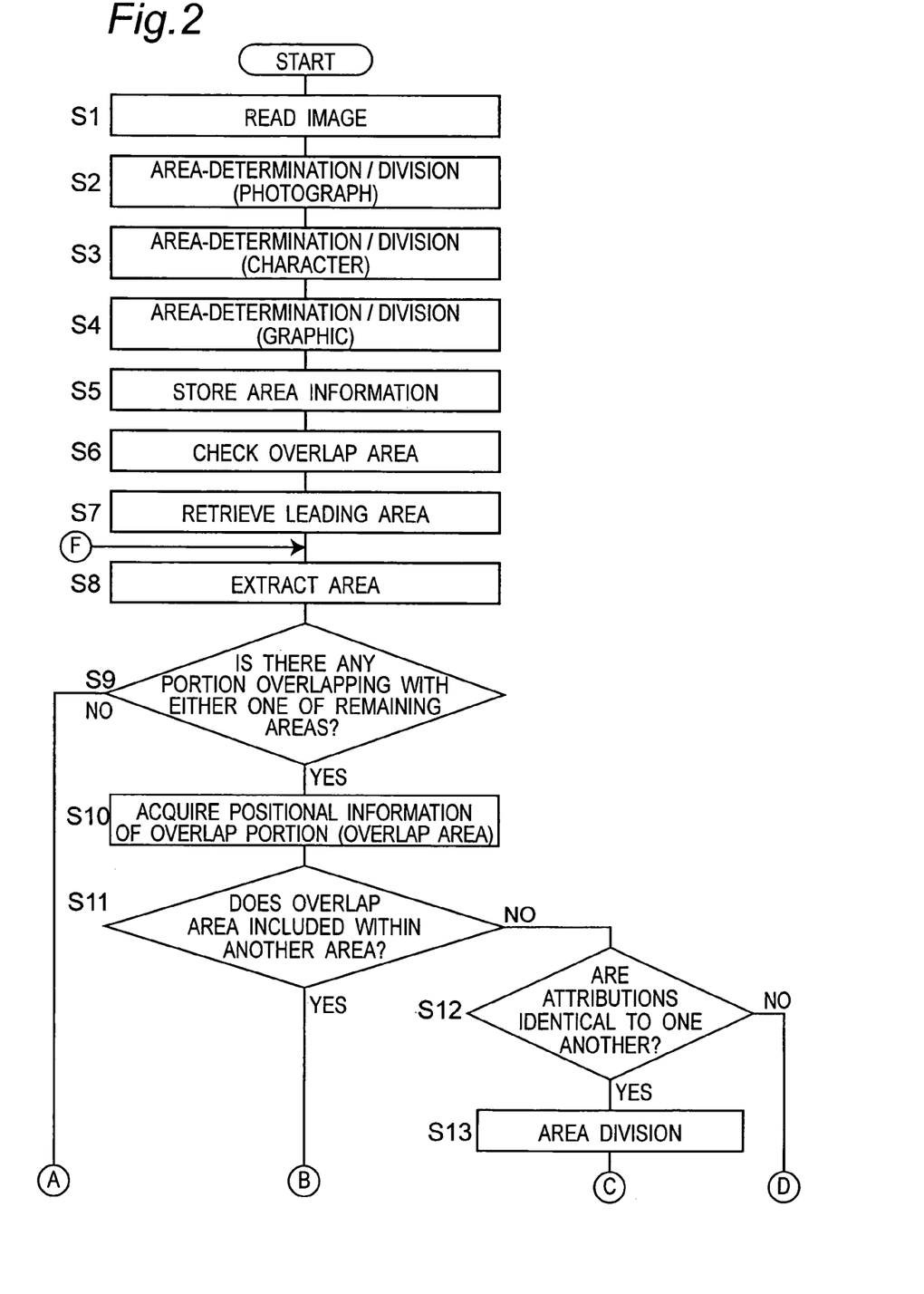
FIG. 2 is a flowchart showing a procedure of area-division/compression according to one embodiment of the present invention.
Figure 3:
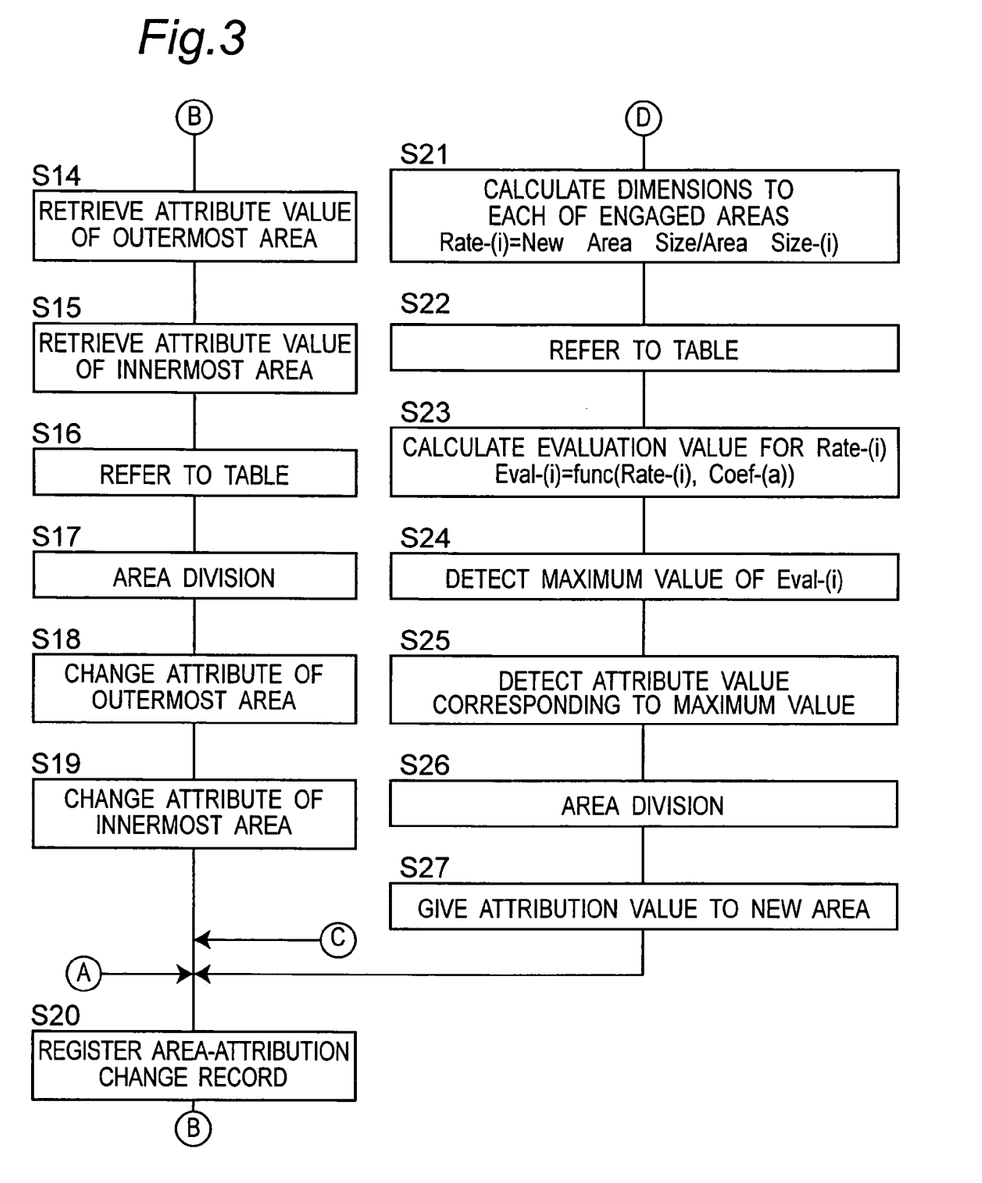
FIG. 3 is a flowchart showing a procedure of area-division/compression according to one embodiment of the present invention.
Figure 4:
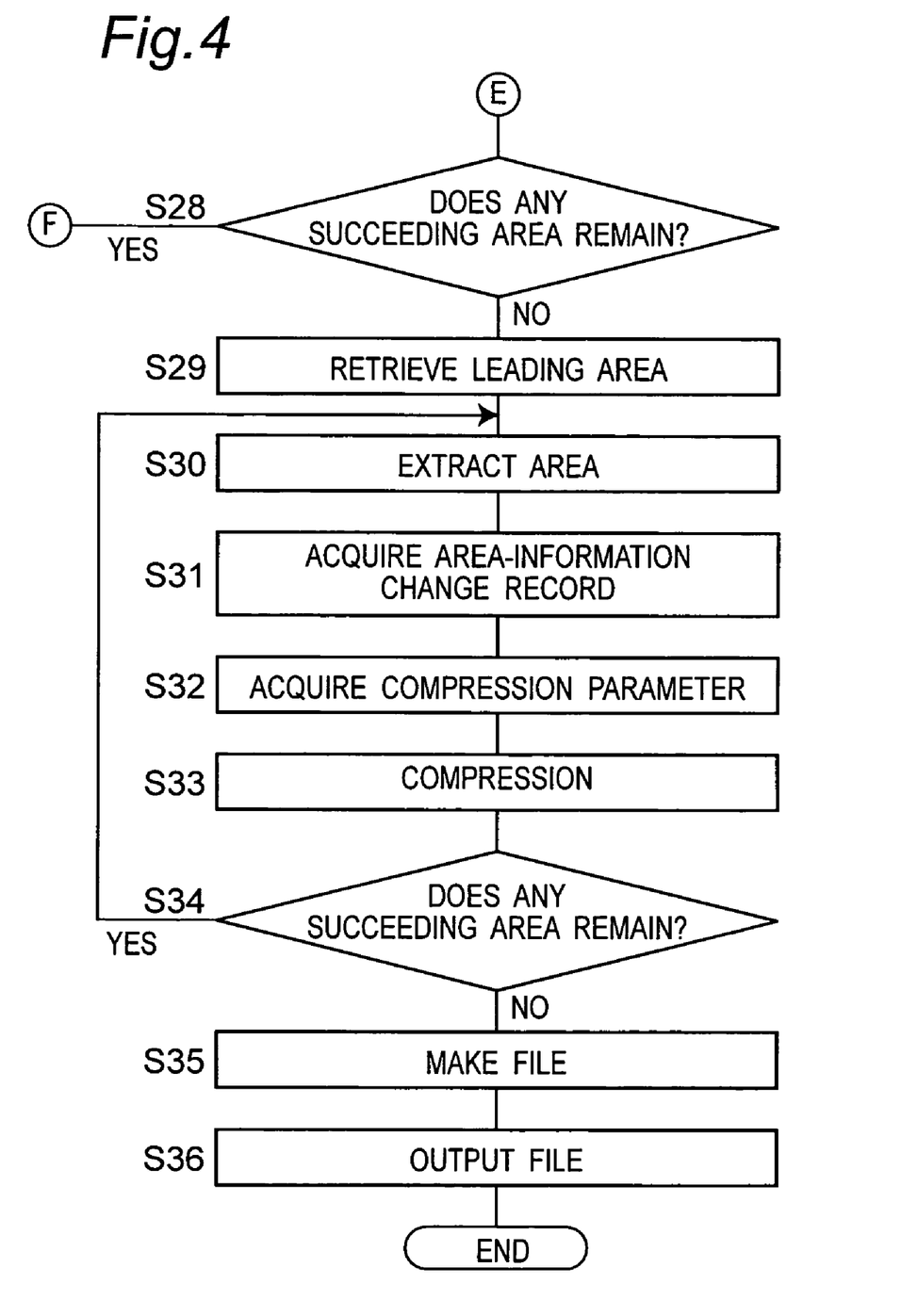
FIG. 4 is a flowchart showing a procedure of area-division/compression according to one embodiment of the present invention.

With reference to the flowcharts in FIGS. 2 to 4, a specific processing routine of the document-image area-division/compression processing to be executed by the personal computer 1 will be described below. As shown in FIGS. 2 to 4, in this processing routine, a document image is first read from the input section 5 (server 6, scanner 7) at Step S1.

Subsequently, at Steps S2 to S4, an area-determination/division processing is executed with respect to photograph, letter and graphic. That is, this processing routine is configured such that the document image is sectionalized (or divided) into a photograph area, a letter area and a graphic area, which are different in optimal compression technique. In this embodiment, the compression techniques for used in a normal case where the image areas are separated independent from each other are shown in Table 1.

TABLE 1

| | Compression Technique in Normal State | | |
|---|---|---|---|
| | Letter Area | Graphic Area | Photograph Area |
| Compression Technique | MMR | Flate | Jpeg (regular) |

Specifically, the letter area is compressed using an MMR adapted to perform data compression through binarization to provide the highest data compression ratio. The graphic area is compressed using a Flate adapted to perform reversible data compression. The photograph area is compressed using a regular Jpeg adapted to perform nonreversible data compression.

Then, at Step S5, the area information obtained through the area-determination and area-division steps is stored in the area-information database in the Data Base (hard disk 2). Further, based on the area information stored in the area-information database, it is checked whether there is any overlap area. When the presence of the overlap area is determined, information about the overlap area is stored in the area-information database.

Then, at Step S7, a leading area in the three areas is retrieved (initialization). Subsequently, at Step S8, based on the area information stored in the area-information database, the leading area is extracted. After the area is extracted, it is determined whether the extracted area has a zone overlapping with either one of the remaining areas, at Step S9. When the area has an overlap zone (YES), positional information of the overlap zone or overlap area is acquired at Step S10. At Step S9, if the area has no overlap zone (NO), the process will skip to Step S20.

Then, at Step S11, it is determined whether the overlap area is included within another one of the remaining areas. When the overlap area is not included therewithin (NO), it is determined whether the two engaged areas causing the overlap area have the same attribute value (attribute), at Step S12. When the two engaged areas have the same attribute value (YES), Step S13 is executed to separate (or divide) this overlap area from the two engaged areas. In this case, the separated overlap area has the same attribute value as that of the two engaged areas. Then, at Step S20, a record of the area-attribute change is registered (stored) in the area-information database.

At the above Step S11, if it is determined that the overlap area is included within another one of the remaining areas (YES), Steps S14 to S19 will be sequentially executed to set up respective attributes of the overlap area (inner area or innermost area) and the area (outer area or outermost area) including the overlap area in accordance with the inclusive relationship. More specifically, the attribute of the outer area is first retrieved at Step S14, and then the attribute of the inner area is retrieved at Step S15.

At Step S16, the area-attribute changing table in the Data Base (hard disc 2) is referred thereto. At Step S17, the outer area and the inner area are separated from one another. The attribute of the outer area and the attribute of the inner area are changed at Steps S18 and S19, respectively. Then, at Step S20, a record of the area-attribute change is registered (stored) in the area-information database.

Table 2 shows a specific example of a technique for changing such attribute values.

TABLE 2

Division/Attribute-Value Change of
Areas involved in Inclusive Relationship

|  |  | Case 1 | Case 2 | Case 3 | Case 4 |
|---|---|---|---|---|---|
| Before Change | Area 1 (including) | Photograph | Photograph | Photograph | Letter |
|  | Area 2 (included) | Photograph | Letter | Graphic | Photograph |
| After Change | Area 1 (including) | Graphic | Photograph | Graphic | Letter |
|  | Area 2 (included) | Photograph | Photograph | Graphic | Graphic |

In Table 2, Case 1 is an example in which an area 2 associated with the photograph attribute is includes within an area 1 associated with the photograph attribute. In this case, the attribute of the area 1 is changed to the graphic attribute because there is a high possibility that the attribute of the area 1 has been erroneously determined as the photograph attribute. Case 2 is an example in which an area 2 associated with the letter attribute is includes within an area 1 associated with the photograph attribute. In this case, the attribute of the area 2 is changed to the photograph attribute because the area 2 will be embossed if it is maintained in the letter attribute. Case 3 is an example in which an area 2 associated with the graphic attribute is includes within an area 1 associated with the photograph attribute. In this case, the attribute of the area 1 is changed to the graphic attribute because there is a high possibility that the attribute of the area 1 has been erroneously determined as the photograph attribute. Case 4 is an example in which an area 2 associated with the photograph attribute is includes within an area 1 associated with the letter attribute. In this case, the attribute of the area 2 is changed to the graphic attribute because there is a high possibility that the attribute of the area 2 has been erroneously determined as the photograph attribute.

In the case where the overlap area is not included within another one of the remaining areas (NO at Step S11), if the two engaged areas are different in attribute value, Steps S21 to S27 will be sequentially executed to newly set an attribute value in the overlap area. More specifically, at Step S21, an areal rate Rate_(i) of the overlap area to each of the two engaged area is calculated by the following formula 1:

$$\text{Rate}\_(i) = \text{NewAreaSize}/\text{AreaSize}(i)$$

wherein NewAreaSize is the size of the overlap area, and AreaSize (i) is the size of an area having an area number (i).

At Step S22, the area-attribute changing table in the Data Base (hard disc 2) is referred thereto. At Step S23, an evaluation value Eval_(i) to the aerial rate Rate_(i) is generally calculated by the following formula 2:

$$\text{Eval}\_(i) = \text{func}(\text{Rate}\_(i), \text{Coef}\_(a))$$

wherein (a) is an area attribute, Coef_(a) being a weighting coefficient set up with respect to each of the area attributes, and func (x, y) being an evaluation function.

Practically, the evaluation value Eval_(i) can be calculated, for example, by the following simple formula 3:

$$\text{Eval}\_(i) = [(1 - \text{Rate}\_(i)) * \text{Coef}\_(a)]$$

Table 3 show a specific example of the weighting coefficient Coef_(a).

TABLE 3

Weighting Coefficient of each Area (for calculation of evaluation value)

| Area | Weighting Coefficient |
|---|---|
| Photograph | 1.5 |
| Graphic | 2 |
| Letter | 3 |

The above specific example is set up on the assumption that the processing is performed to a document image. Thus, the largest weighting coefficient is given to the letter area, and the smallest weighting coefficient is given to the graphic area. If it is set up on the assumption that the processing is performed to a general photograph, the largest and smallest weighting coefficients may be given to the photograph and letter areas, respectively.

That is, the above calculation method of the evaluation value Eval_(i) to each of the areas is intended to calculate in which of the engaged areas the overlap area is included at a larger rate, so as to estimate to which of the attributes of the engaged area the attribute of the overlap area is close. For example, when only a small portion of the letter area is included in the photograph area, it is estimated that the overlap area has no attribute of photograph. This allows a printed image to give an impression in conformity to that to be made from viewing of an original document image.

At Step S24, a maximum value of the evaluation value Eval_(i) is detected. At Step S25, an attribute value corresponding to the maximum value of the evaluation value Eval_(i) is detected. At Step S26, the overlap area is divided. At Step S27, an attribute value is newly given to the separated overlap area. Then, Step S20, a record of the area-attribute change is registered (stored) in the area-information database.

After the area-attribute change record is registered in the area-information database, it is determined whether any succeeding area remains. If any succeeding area remains (YES), Steps S8 to S28 will be repeatedly executed (a part of the steps may be not executed depending on conditions). When it is determined that no succeeding area remains (NO), the leading area is retrieved (initialization) at Step S29, and subsequently the leading area is extracted from the area-information database at Step S30.

Then, at Step S31, the area-information change record is acquired from the area-information database. Subsequently, at Step S32, a compression parameter is acquired from the compression database in the Data Base (hard disk 2). Then, at Step S33, the area is compressed according to the compression parameter acquired at Step S32.

Table 4 shows a specific example of a compression method for the area having the attribute change record.

Then, at Step S34, it is determined whether any succeeding area remains. If any succeeding area remains, Steps S30 to S34 will be repeatedly executed.

When it is determined whether no succeeding area remains at Step S34, an image data file is made from the image data compressed at Step S35. Then, at Step S36, the image data file is output to the output section 8 (server 6, printer 10), and the document-data area-division/compression processing is completed.

Some specific examples of the area division based on the area-division/compression processing as shown in FIGS. 2 to 4 will be described below.

Figure 5:
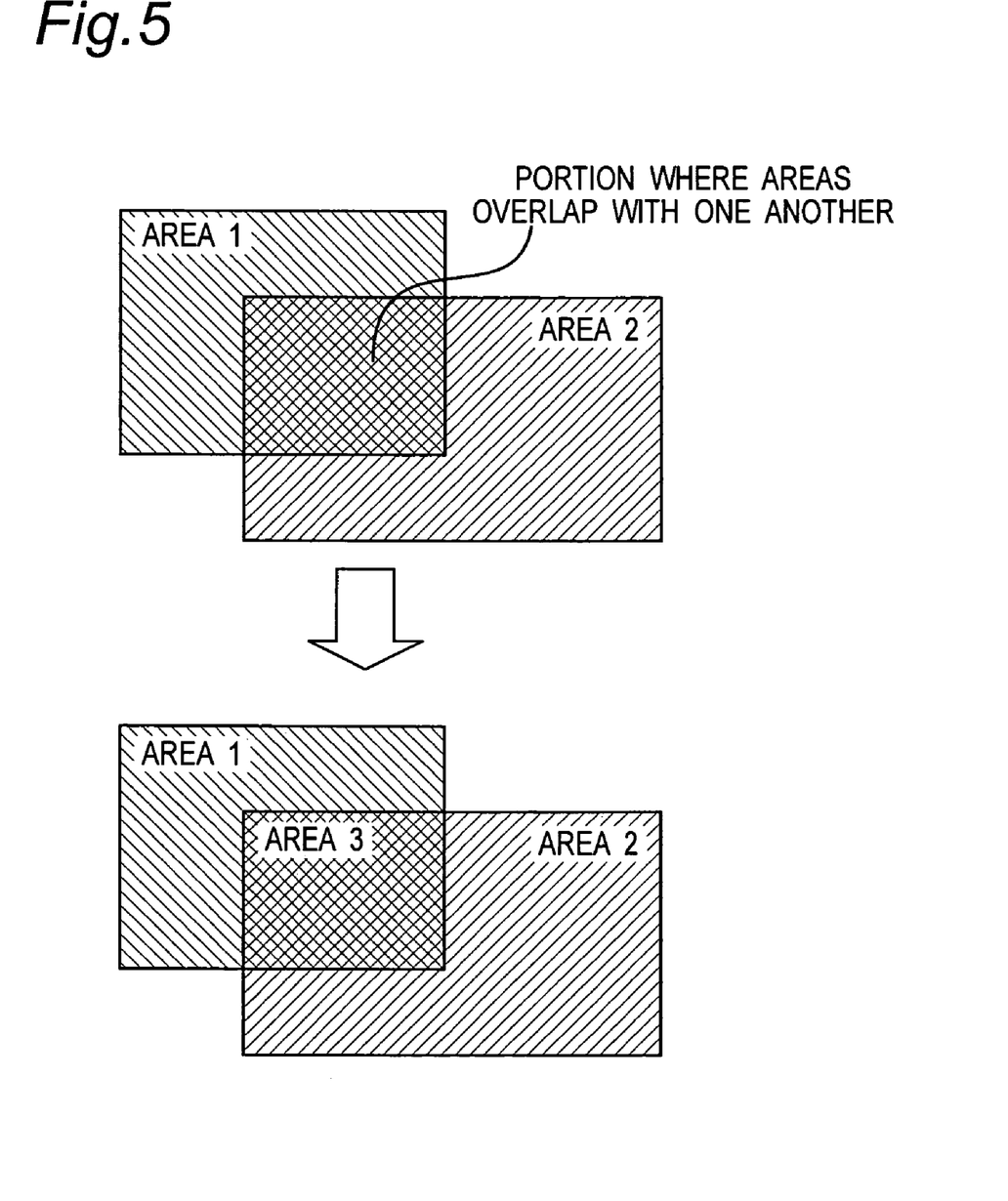
FIG. 5 is an explanatory view of one example of an area division technique for use in case where two areas overlap with one another.

As shown in FIG. 5, in case where two areas 1 and 2 partly overlap with one another but the overlap area is includes within neither the area 1 nor the area 2, when the areas 1, 2 are different in attribute value from one another, the overlap area is separated as an area 3, and an attribute value is newly set in the area 3, according to Steps S21 to S27. For example, if an evaluation value of the area 3 (overlap area) to the area 1 and an evaluation value of the area 3 to the area 2 are calculated by the formulas 1 to 3, and the former evaluation value is greater than the latter evaluation value, an attribute value identical to that of the area 1 will be given to the area 3.

Figure 6:
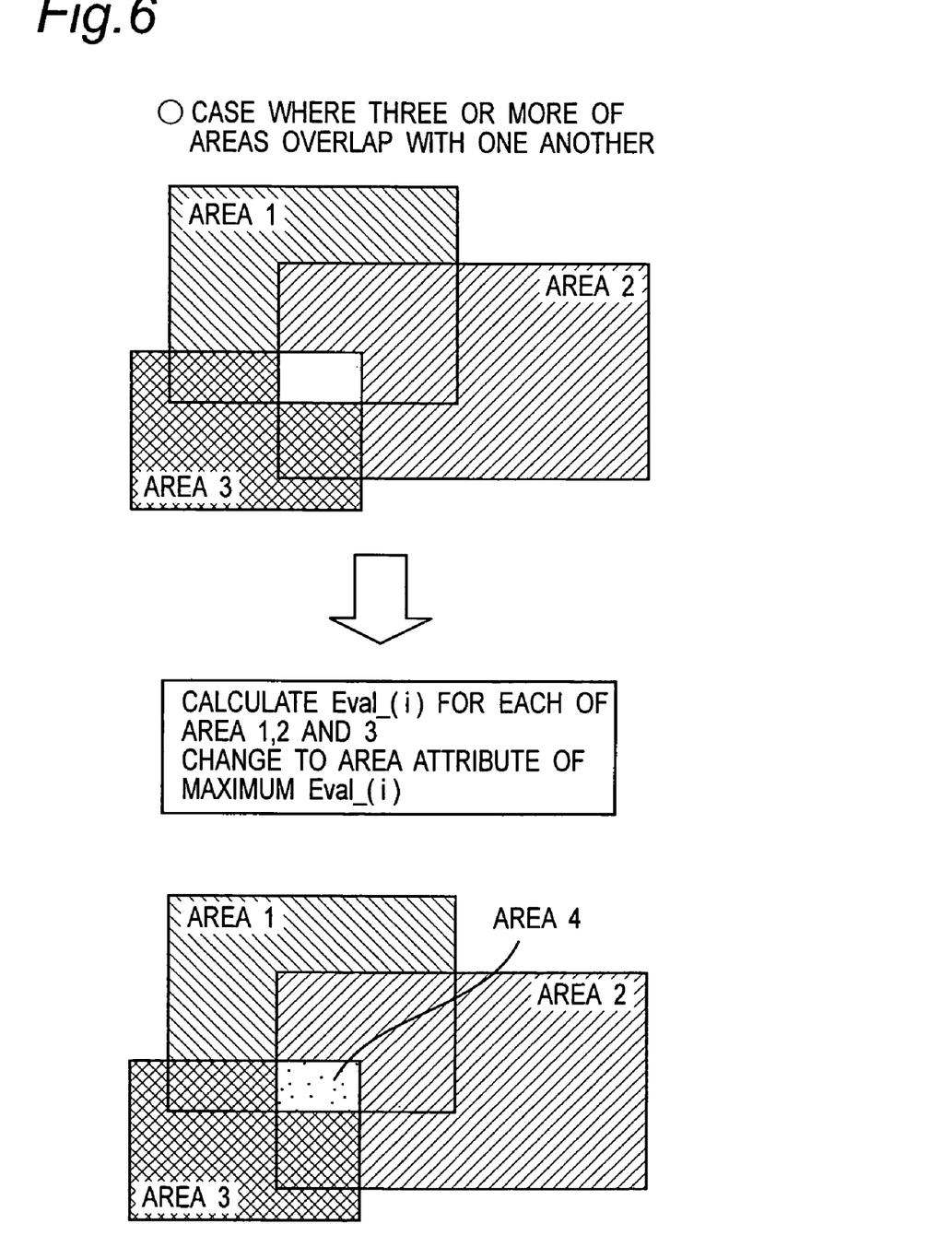
FIG. 6 is an explanatory view of one example of an area division technique for use in case where three areas overlap with each other.

Further, as shown in FIG. 6, in case where three areas 1, 2 and 3 partly overlap with each other but one (triple overlap area) of the overlap areas is includes within none of the areas 1, 2 and 3, when the areas 1, 2, 3 are different in attribute value from each other, this overlap area is separated as an area 4, and an attribute value is newly set in the area 4, according to Steps S21 to S27. For example, if an evaluation value of the area 4 (overlap area) to the area 1 and an evaluation value of the area 4 to the other areas 2, 3 are calculated by the formulas 1 to 3, and the former evaluation value is greater than the latter evaluation value, an attribute value identical to that of the area 1 will be given to the area 4.

Furthermore, when three areas (as well as four or more areas) overlap with each other, and one of the areas is included within the overlap area between the remaining two areas, the overlap area between the two non-included area may be subjected to the area division processing to determine an attribute value thereof, and then an attribute for each of this overlap area and the included area may be determined according to the inclusive relationship.

Figure 7:
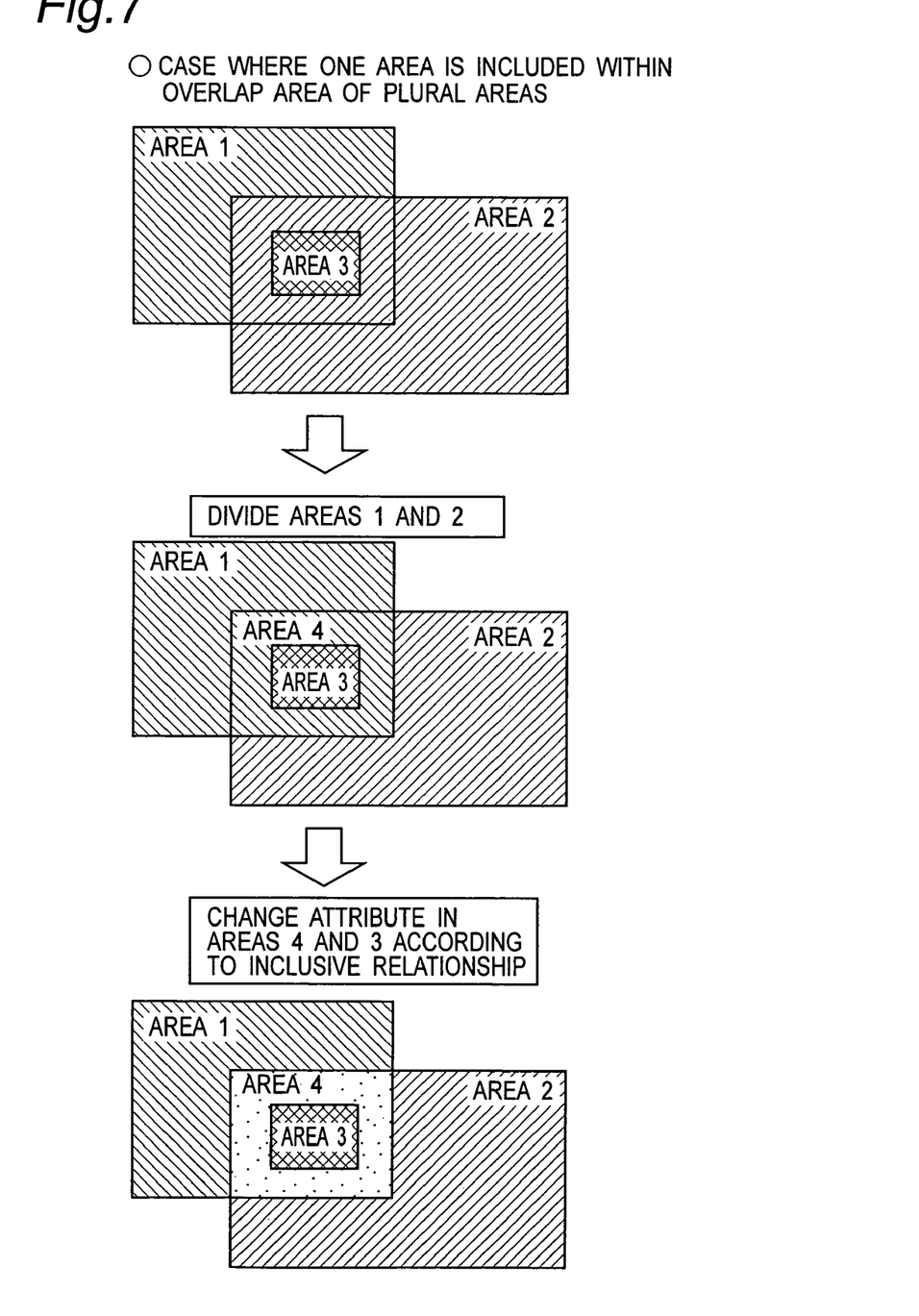
FIG. 7 is an explanatory view of another example of the area division technique for use in case where three areas overlap with each other.

Specifically, as shown in FIG. 7, when three areas 1, 2 and 3 overlap with each other, and the area 3 is included within the overlap area between the areas 1 and 2, the areas 1 and 2 are subjected to the same time division processing as that in FIG. 5. That is, when the areas 1, 2 are different in attribute value, the overlap area between the areas 1 and 2 is separated as an area 4 according to Steps S21 to S27, and an attribute value is newly set up in the area 4. For example, if an evaluation value of the area 4 to the area 1 and an evaluation value of the area

TABLE 4

Compression Method for Area having Attribute Change Record

| | Case 1 | Case 2 | Case 3 | Case 4 | Case 5 | Case 6 | Case 7 | Case 8 | Case 9 |
|---|---|---|---|---|---|---|---|---|---|
| Attribute 1 | Photo | Photo | Photo | Graphic | Graphic | Graphic | Letter | Letter | Letter |
| Attribute 2 | Letter | Photo | Graphic | Letter | Photo | Graphic | Letter | Photo | Graphic |
| Compression Method | color reduction Flate | Jpeg (strong) | Jpeg (weak) | color reduction Flate | Jpeg (regular) | Flate | MMR | Jpeg (regular) | Flate |

Attribute 1: initial area-attribute
Attribute 2: area attribute after re-area-division 3 to the other areas 2 are calculated by the formulas 1 to 3, and the former evaluation value is greater than the latter evaluation value, an attribute value identical to that of the area 1 will be given to the area 4. Then, the attribute value is finally determined according to the inclusive relationship according to Steps S14 to S19. In the example illustrated in FIG. 7, the attribute value of the area 4 is changed to the attribute value of the area 3.

A more specific area-division technique will be described below in conjunction with two cases where a single document image includes photograph and letter areas in a mixed manner, and the two areas partly overlap with one another.

(Case 1)

Figure 8:
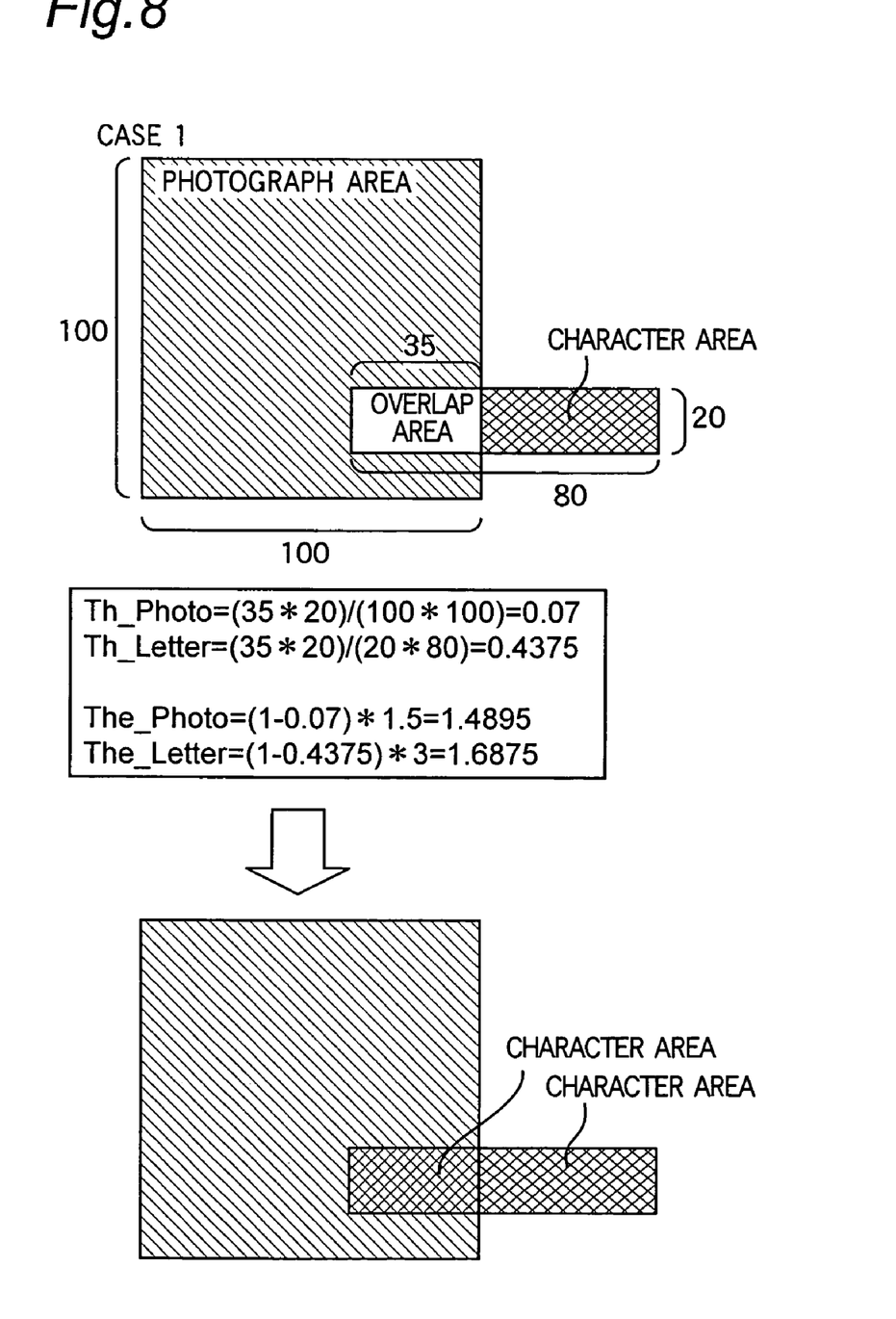
FIG. 8 is an explanatory view of one example of an area division technique for use in case where a photograph area partly overlaps with a letter area.

As shown in FIG. 8, a photograph area having a vertical size of 100 and a horizontal size of 100 and a letter area having a vertical size of 20 and a horizontal size of 80 partly overlap with one another to form an overlap area having a vertical size of 20 and a horizontal size of 35. In this case, according to the formula 1, the areal rate of the overlap area to the photograph area Th_Photo is 0.07 ((35 * 20)/(100 * 100)=0.07), and the areal rate of the overlap area to the letter area Th_Letter is 0.4375 ((35 * 20)/(20 * 80)=0.4375).

Thus, according to the formula 3, the evaluation value of the overlap area to the photograph area The_Photo is 1.4895 ((1−0.07) * 1.5=1.4895), and the evaluation value of the overlap area to the letter area The_Letter is 1.6875 ((1−0.4375) * 3=1.6875). Therefore, the evaluation value The_Letter is greater than the evaluation value The_Photo, and thereby the overlap area is determined as a letter area.

Figure 9:
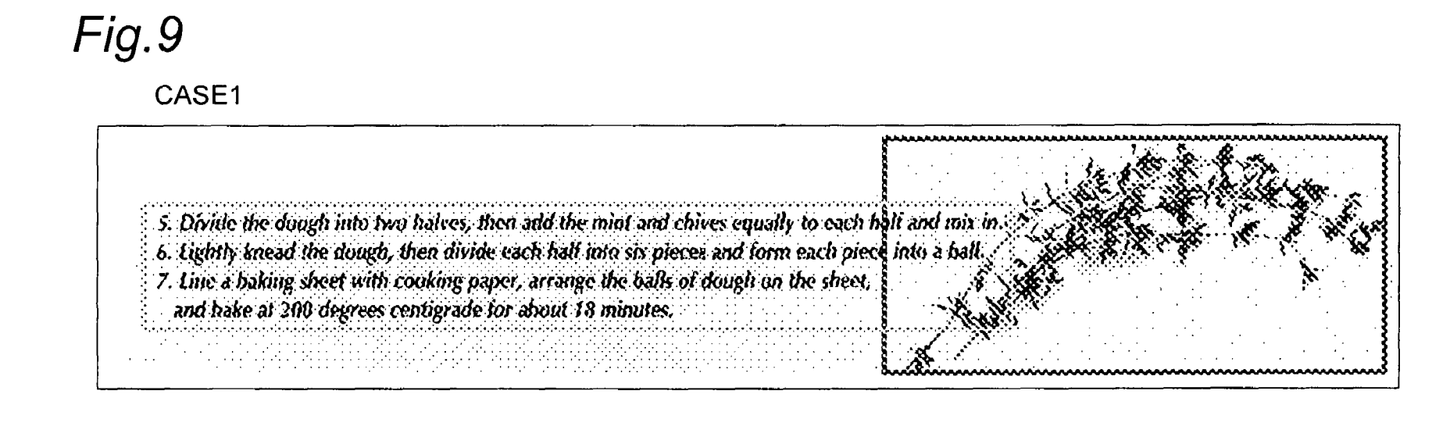
FIG. 9 is an explanatory view of one example of a printed image in case where an overlap area between a photograph area and a letter area is defined as a letter area.

FIG. 9 shows one example of a printed image using an image data compressed under the condition that an overlap area is determined as a letter area in a document image including a photograph area and a letter area which partly overlap with one another to provide a greater evaluation value of the overlap area to the letter area than an evaluation value of the overlap area to the photograph area. As seen in FIG. 9, the printed image is adequately formed without any feeling of strangeness.

(Case 2)

Figure 10:
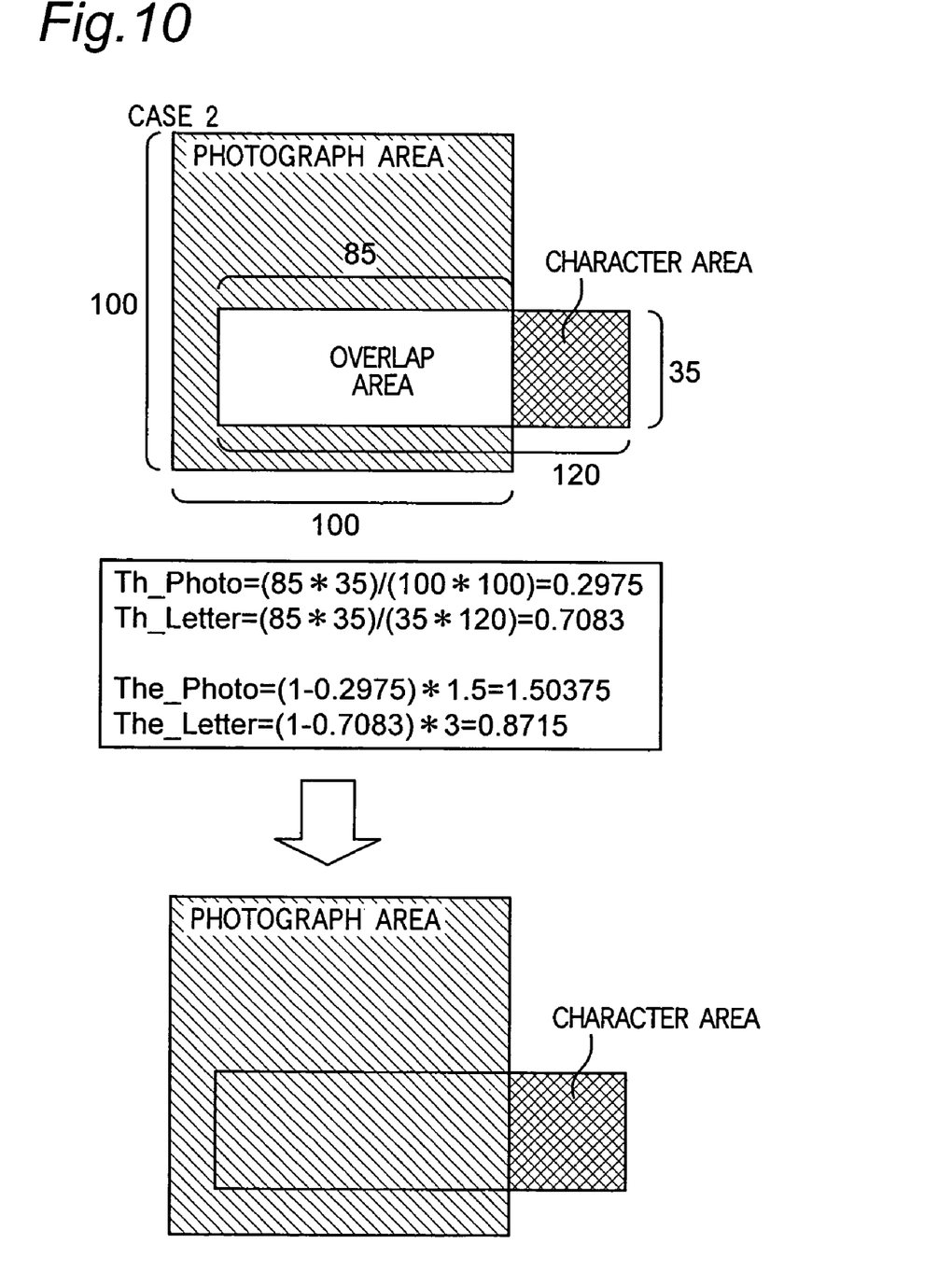
FIG. 10 is an explanatory view of another example of the area division technique for use in case where a photograph area partly overlaps with a letter area.

As shown in FIG. 10, a photograph area having a vertical size of 100 and a horizontal size of 100 and a letter area having a vertical size of 35 and a horizontal size of 120 partly overlap with one another to form an overlap area having a vertical size of 35 and a horizontal size of 85. In this case, according to the formula 1, the areal rate of the overlap area to the photograph area Th_Photo is 0.2975 ((85 * 35)/(100 * 100)=0.2975), and the areal rate of the overlap area to the letter area Th_Letter is 0.7083 ((85 * 35)/(35 * 120)=0.7083).

Thus, according to the formula 3, the evaluation value of the overlap area to the photograph area The_Photo is 1.50375 ((1−0.2975) * 1.5=1.50375), and the evaluation value of the overlap area to the letter area The_Letter is 0.8715 ((1−0.7083) * 3=0.8715). Therefore, the evaluation value The_Photo is greater than the evaluation value The_Letter, and thereby the overlap area is determined as a photograph area.

Figure 11:
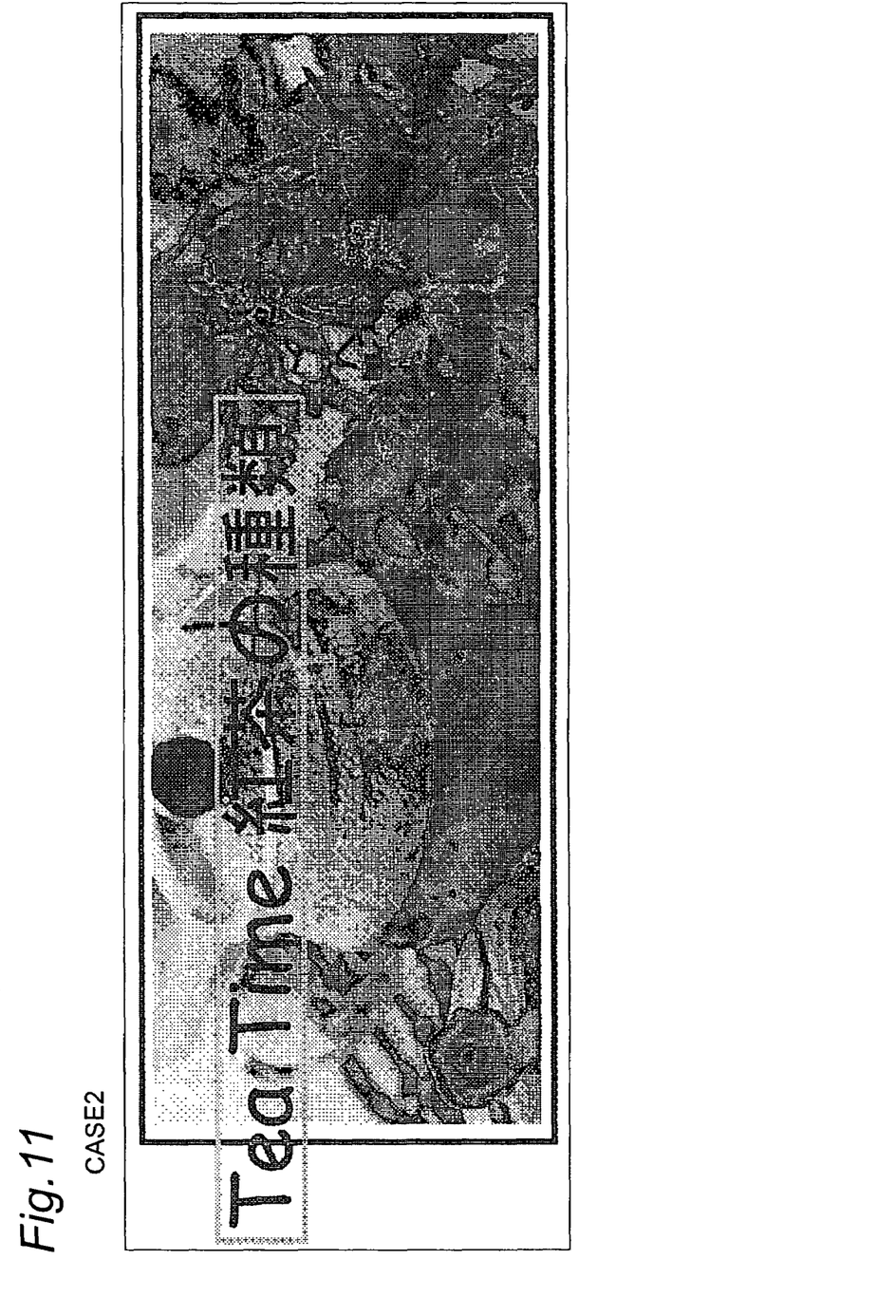
FIG. 11 is an explanatory view of one example of a printed image in case where an overlap area between a photograph area and a letter area is defined as a photograph area.

FIG. 11 shows one example of a printed image using an image data compressed under the condition that an overlap area is determined as a photograph area in a document image including a photograph area and a letter area which partly overlap with one another to provide a greater evaluation value of the overlap area to the photograph area than an evaluation value of the overlap area to the letter area. As seen in FIG. 11, the printed image is adequately formed without any feeling of strangeness.

The above image processing system may be configured such that the overlap area is compressed by a combination of the compression technique for the respective attributes of the image areas overlapping with each other and the compression technique for the attribute of the overlap area.

As mentioned above, according to the above embodiment of the present invention, an optimal area division can be executed while minimizing erroneous determinations. In addition, any overlap area can be eliminated to avoid any unproductive processing in compression/storage processing while allowing an optimal compression method to be applied thereto in consideration of the respective attributes of the divided areas. Furthermore, the need for acquiring information about surroundings of the overlap area can be eliminated to achieve a high-speed image data professing.

An advantageous embodiment of the invention has been shown and described. It is obvious to those skilled in the art that various changes and modifications may be made therein without departing from the spirit and scope thereof as set forth in appended claims.

What is claimed is:

1. A method of executing area-division and compression of a document image, comprising:
   sectionalizing said document image on the basis of attributes associated with a compression mode to form a plurality of image areas each having an attribute associated with the compression mode;
   determining whether said image areas partly or fully overlap with one another to form an overlap area;
   separating said overlap area from said image areas that overlap each other if said overlap area has been formed, and setting an attribute associated with the compression mode for said overlap area according to an inclusive relationship between said image areas that overlap each other when all of said overlap area between two of the image areas is included within a third image area and newly setting an attribute associated with the compression mode for said overlap area according to priorities of the respective attributes of said image areas that overlap each other, and the positional relationship between said overlap area and each of said image areas that overlap each other when all of said overlap area between two image areas is not included within another image area; and
   compressing each of said image areas and said overlap area using a compression technique corresponding to the attribute of said respective area.

2. The method according to claim 1, wherein in said separating step, the attribute for said overlap area is set according to an occupancy rate of said overlap area to each of said image areas that overlap each other, and weighting coefficients of the respective attributes of said image areas that overlap each other.

3. A method of executing area-division and compression of a document image, comprising:
   sectionalizing said document image on the basis of attributes of said image document to form a plurality of image areas each having an attribute;
   determining presence of overlapping among said sectionalized image areas;
   extracting overlapping image areas determined in said determining step, and setting an attribute for each of said extracted overlapping image areas according to an inclusive relationship between said image areas that overlap each other when all of the extracted overlapping image area between two of the image areas is included within a third image, and newly setting an attribute for said extracted overlapping image area according to the respective attributes of said image areas that overlap each other when all of said extracted overlapping image area between two image areas is not included within another image area; and compressing each of said image areas of said document image using a compression technique corresponding to the attribute of said area obtained in said sectionalizing step or extracting step.

4. The method according to claim 3, wherein in said extracting step, the attribute for said extracted area is set according to an occupancy rate of said extracted area to each of said image areas that overlap each other, and weighting coefficients of the respective attributes of said that overlap each other image areas.

5. A computer system for executing area-division and compression of a document image, comprising:
- a first section which sectionalizes said document image on the basis of attributes associated with a compression mode to form a plurality of image areas each having an attribute associated with the compression mode;
- a second section which determines whether said image areas partly or fully overlap with one another to form an overlap area;
- a third section which separates said overlap area from said image areas that overlap each other if said overlap area has been formed, and sets an attribute associated with the compression mode for said overlap area according to an inclusive relationship between said image areas that overlap each other when all of said overlap area between two of the image areas is included within a third image area, and newly setting an attribute associated with the compression mode for said overlap area according to priorities of the respective attributes of said image areas that overlap each other, and the positional relationship between said overlap area and each of said image areas that overlap each other when all of said overlap area between two image areas is not included within another image area; and
- a fourth section which compresses each of said image areas and said overlap area using a compression technique corresponding to the attribute of said respective area.

6. The computer system according to claim 5, said third section sets the attribute for said overlap area according to an occupancy rate of said overlap area to each of said image areas that overlap each other, and weighting coefficients of the respective attributes of said image areas that overlap each other.

7. A computer system for executing area-division and compression of a document image, comprising:
- a first section which sectionalizes said document image on the basis of attributes of said image document to form a plurality of image areas each having an attribute;
- a second section which determines presence of overlapping among said sectionalized image areas;
- a third section which extracts overlapping image areas determined by said second section, and sets an attribute for each of said extracted overlapping image areas according to an inclusive relationship between said image areas that overlap each other when all of the extracted overlapping image area between two of the image areas is included within a third image area, and newly setting an attribute for said extracted overlapping image area according to the respective attributes of said image areas that overlap each other when all of said extracted overlapping image area between two image areas is not included within another image area; and
- a fourth section which compresses each of said image areas of said document image using a compression technique corresponding to the attribute of said area obtained by said first section or said third section.

8. The computer system according to claim 7, wherein said third section sets the attribute for said extracted area according to an occupancy rate of said extracted area to each of said image areas that overlap each other, and weighting coefficients of the respective attributes of said that overlap each other image areas.

* * * * *